United States Patent [19]

Boutin

[11] Patent Number: 4,581,062
[45] Date of Patent: Apr. 8, 1986

[54] PROCESS FOR THE CONTINUOUS PURIFICATION OF METALS BY FRACTIONAL CRYSTALLIZATION ON A ROTARY DRUM

[75] Inventor: Francois R. Boutin, Virieu, France

[73] Assignee: Aluminium Pechiney, Paris, France

[21] Appl. No.: 733,268

[22] Filed: May 13, 1985

[30] Foreign Application Priority Data

May 17, 1984 [FR] France ................................ 84 08174

[51] Int. Cl.⁴ .............................................. C22B 9/16
[52] U.S. Cl. ....................................... 75/63; 75/68 R
[58] Field of Search .................................. 75/63, 68 R

[56] References Cited

U.S. PATENT DOCUMENTS 3,239,899  3/1966  Johnson ................................. 75/63
3,307,936  3/1967  Smith, Jr. .............................. 75/63

Primary Examiner—Melvyn J. Andrews
Attorney, Agent, or Firm—Dennison, Meserole, Pollack & Scheiner

[57] ABSTRACT

The invention relates to a process for fractional crystallization of metals at the surface of a rotary drum.

It is characterized in that the distance between the drum (1) and the bottom of the trough (4) containing the metal in the liquid state is regulated and said trough is divided, in the direction of rotation of the drum (3), into an upstream zone (6) and a downstream zone (7) between which the circulation of liquid is restricted, said distance being regulated in such a way as possibly to permit the crystals to be compressed in the upstream zone, and that the crystals are re-melted in the downstream zone, in order to collect the purified metal in the liquid state.

The invention is used in the continuous purification of metals such as in particular aluminum.

7 Claims, 8 Drawing Figures

PROCESS FOR THE CONTINUOUS PURIFICATION OF METALS BY FRACTIONAL CRYSTALLIZATION ON A ROTARY DRUM

The present invention concerns a process for the continuous purification of metals by fractional crystallization on a rotary drum.

The man skilled in the art is well aware that, when cooling an alloy which has been previously melted in order to put it into the solid state, the first crystals which appear are in most cases different in composition from the composition of the alloy used.

Thus, starting from a basic metal containing another element in a concentration $C_L$, it is possible by fractional crystallization to separate off a solid in which the concentration in respect of said element has become $C_S$ and such that $C_S$ is lower than $C_L$. That phenomenon has been applied to the purification of metals, in particular to remove therefrom impurities which are referred to as eutectic when they are in hypoeutectic proportions. That phenomenon was the basis for a number of processes, some of which have been patented and which are primarily distinguished by the procedure for cooling the alloy, effecting exchanges between the liquid and solid phases and separating the crystals. Each of those processes gives specific advantages which relate inter alia either to the production capacity involved or to the degree of purification achieved.

Thus, French Pat. No 1 594 154 describes a process for purifying aluminium, in particular in respect of silicon and iron, which comprises the following successive phases:

causing solidification of a volume of liquid metal contained in an externally heated crucible by introducing an internally cooled body, collecting at the bottom of the crucible the small crystals which formed, causing sintering of the small crystals to produce large crystals, and separating the large crystals of pure metal from the impure mother liquor, either by siphoning off the latter or by sawing up the billet of metal collected after solidification of the whole.

It is true to say that such a process makes it possible to produce a metal in a very high state of purity. However, in the course of one operation, it is applied to the amount of impure metal initially introduced into the crucible, and it is therefore necessary to include stages for discharging and recharging the crucible. That limits the amount of time available for the purification step in the true sense and thus results in a relatively low level of productivity in comparison with that achieved by a continuous process. Moreover, as the level of purity of the crystals depends on that of the liquid phase, and as the impurities content of the latter progressively increases, the level of purity of the crystals falls and finally a product of heterogeneous quality is obtained in the course of one operation.

To overcome those disadvantages, other processes have been put forward for effecting such fractional crystallization in a continuous mode. Thus for example, French Pat. No. 2 285 915 discloses a process characterised by "the formation of a column consisting of a paste of metal crystals in a liquid metal; said column comprising a relatively cold zone and a relatively hot zone and a continuous temperature gradient between said zones". That process also includes the supplementary phases "of introducing an impure feed metal into the column and continuously taking off a portion of the pure liquid metal from the "hot" zone".

However, it is recognized in French Pat. No. 2 359 210 that such a process encountered difficulties in regard to the flow of the liquid through the crystals, and it was necessary for the column to incorporate movable mechanical devices so as to impart a reciprocating motion to the crystals. The fear then is that such devices which are subjected to the rubbing effect of the crystals may be a cause of pollution in the metal being treated.

French Pat. No. 2 390 994 also discloses a process for the purification of solid materials "by melting followed by a fresh solidification step characterised in that a rotary drum is immersed in the melted solid material and that the material to be purified, which clings to the surface of the drum and which solidifies thereon, upon issuing from the molten mass, passes through a zone which is disposed downstream and in which the solidified substance clinging to the drum is subjected to re-melting."

Such a process has been successfully applied to the purification of metals such as silicon and germanium.

However, it is found that the application of that process to other metals such as aluminium for example results in the formation of a layer of crystals having a certain degree of porosity on the drum, whence the layer is impregnated by impure mother liquor and there is a drop in the quality of the product obtained. In addition, the adhesion of the crystals to the surface of the drum is sometimes very great, which makes it difficult to recover them and may result in their being polluted by the material of the drum.

In addition, as those crystals do not have any cohesion with each other, they are unsuitable for metallurgical transformation operations and must therefore be re-melted beforehand. That is a handicap in comparison with processes which result in a metal in the liquid state, which can be cast in a solid form which can be used directly.

Finally, when treating metals which easily undergo oxidation, it is not possible to put the crystals which issue in a hot condition from the bath directly into contact with the atmosphere without giving rise to a certain amount of pollution by the air. It is therefore necessary to provide sealed installations which detrimentally affect the cost of the equipment required for carrying such a process into effect.

It is for that reason that the present applicants, being aware of the attraction of continuous processes but also being conscious of the difficulties inherent in each thereof, sought to find new ways of overcoming such disadvantages while also achieving further advantages. The applicants' work resulted in the development of a process for the continuous purification of metals by fractional crystallization on a cooled portion of the surface of a rotary drum partially immersed in a bath of molten metal contained in a trough characterised in that the distance between the drum and the bottom of the trough is controlled and the trough is divided in the direction of rotation of the drum into an upstream zone and a downstream zone which are virtually independent of each other, that the downstream zone is heated and the crystals are completely re-melted within the bath, and that at least a portion of the purified liquid resulting from the re-melting operation is taken off in said zone.

Thus, as in the prior art, the process according to the invention involves using a drum with a horizontal axis, the diameter thereof generally being between 20 and 200 cm and the drum being made of a material which is insoluble in the bath of metal to be treated. The drum is driven with a rotary movement about its axis at a speed which can be varied by mechanical means such as a motor-reducing unit for example. The drum is partially immersed in the metal bath which is maintained in the liquid state by suitable heating means and contained in a trough which is also of insoluble material and the bottom of which is generally parallel to the generatrices of the drum.

The surface of the drum is cooled to a temperature which is lower than the solidification temperature of the bath either naturally or by projecting a cold-carrier fluid such that, at the time at which it passes into the bath, it is covered with a layer of crystals, the thickness of which increases as it progresses.

However, unlike the prior art wherein the layer of crystals grew throughout the period for which the surface was immersed and was collected on issuing from the bath, the process according to the invention involves interrupting that growth and providing for complete re-melting of the crystals within the bath. The re-melting operation is carried out by passing the drum, at a given time, into a zone of the trough which is at a temperature higher than the melting temperature of the crystals and which, as considered in the direction of rotation of the drum, is disposed downstream of the upstream zone where the crystallization step occurs. That zone may be heated by any suitable means. Such means may be for example an immersion heater which is immersed in the downstream zone in the proximity of the layer of crystals and which uses the energy either of a hot fluid or an electrical current. The heating means may also comprise heating the portion of the drum, on which the crystal re-melting effect is to occur. In order to achieve such a result, use is made of a drum which rotates around a fixed hollow shaft. The shaft is provided with two radial sectors which extend over the entire length of the drum and which extend as far as the wall of the drum against which they slide, and between them they form an angle such that on the wall of the drum they define the surface portion which is to undergo reheating. A hot fluid is caused to circulate in the volume which is thus defined, by means of the hollow shaft, or else electrically heated elements are disposed therein.

Thus, the crystal remelting operation makes it possible to avoid pollution of the pure metal by oxidation or by the material of the drum, as occurred with the prior art methods. However, it is found to be difficult for such a process to be carried out in the arrangements of the prior art for, because of the relatively substantial distance between the layer of crystals and the bottom of the trough and the entrainment movement produced in the bath by the rotary motion of the drum, mixing of the bath in the upstream and downstream zones occurs so that the liquid which is taken off from the downstream zone is little different in purity from the initial liquid introduced into the upstream zone.

It is in order to prevent mixing of the bath in the two zones that the invention is also characterised in that the distance between the drum and the bottom of the trough is controlled and the trough is divided into an upstream zone and a downstream zone which are virtually independent of each other.

As noted hereinbefore, the layer of crystals which is deposited on the drum has a tendency to grow progressively as it passes through the upstream zone of the trough and then to decrease in the downstream zone by virtue of the remelting operation. Therefore, the layer of crystals locally has a maximum thickness, a sort of excrescence, which, by virtue of the symmetry of the apparatus, extends along the length of a generatrix of the drum. It is along that generatrix that the operation of controlling the distance between the drum and the bottom of the trough is preferably effected as the presence of that excrescence formed by the crystals may be used to limit the movement of liquid from one zone of the trough to the other.

The distance control operation may simply consist of bringing the surface of the drum and the bottom of the trough towards each other so as to give a restricted space through which the flow of the liquid is retarded, but it is preferable for the layer of crystals, at the location of the local excrescence, to come into contact with the bottom of the trough in order to prevent the flow of liquid between the zones in question.

However, under those conditions, it was found that certain crystals formed porous accumulations within which a relatively substantial amount of the bath collected so that impure metal was transported towards the downstream re-melting zone which consequently resulted in a drop in the level of purity of the metal.

It is for that reason that the operation of controlling the distance between the drum and the bottom of the trough is also carried out in such a way as to adjust that distance between the drum and the bottom of the trough, in the region in which the distance is controlled, to a value which is less than the thickness of the crystal excrescence. By operating in that way, the crystals are compressed and the bath is expelled from the mass thereof before they pass into the downstream re-melting zone. Such a distance control action has been found to be particularly effective in regard to the purity of the metal produced.

There are two ways of controlling the distance between the drum and the bottom of the trough, which comprise either using a trough which has a bottom of a particular shape or displacing the drum with respect to the trough.

As regards the bottom of the trough, in the region of the restricted space it may be of a circular configuration which is concentric with the surface of the drum so as to create a volume which is in the shape of a portion of a ring. That volume is extended on respective sides of the drum by two upstream and downstream volumes, forming kinds of bath reserve, which are provided with means for supplying metal to be purified and for removing the purified liquid and the liquid which has become charged with impurities in the course of the treatment.

However, in the situation where the crystals are not subjected to a compression effect, the ring portion may serve as a trap for the impure bath. It is for that reason that it is preferable for the bottom of the trough to be of a configuration such that the space between the drum and the bottom of the trough decreases in the upstream zone and increases in the downstream zone, as considered in the direction of rotation of the drum. The location at which the space is at a minimum approximately corresponds to the generatrix of the cylinder on which the crystal excrescence is disposed. The above-indicated space may be greater than the height of the crystal excrescence but preferably it is the same or, better, less, so that the crystals are compressed and the liquid is expelled towards the upstream zone.

The drum-trough bottom distance control may also be achieved by moving the drum with respect to the bottom of the trough with a cyclic movement comprising a translatory movement of the drum in a downward direction, a rotary movement over the bottom of the upstream zone of the trough and a return to the initial position.

In its translatory movement downwardly, the drum comes to bear against the layer of crystals at the location at which it is of maximum thickness so that the crystals are compressed. Then, by rolling over the bottom of the trough, the drum compresses the layer of crystals which is disposed upstream, while urging the liquid towards the upstream reserve of the trough. The liquid displacement movement may affect all or part of the surface portion of the drum which is covered with crystals. Finally, the drum is returned to its initial position and the normal rotary movement of the drum which had been interrupted just before the cycle took place is then resumed.

Such a cyclic movement may be produced by any mechanical means which are known to the man skilled in the art and which operate on the position of the axis of the cylinder and on its rotary movement.

That form of control is applied to a trough that is of a shape which is concentric with the drum but it may be combined with the trough of special shape.

The cyclic movement occurs with a certain periodicity which is linked to the rotary movement of the drum. Thus, it is initiated after a period of rotary movement which is at most equal to the time required for a point on the drum to pass through the whole of the upstream zone. In that way, it is considered that all the layer of crystals is subjected to the compression treatment and there is no danger of impure liquid being entrained therewith into the downstream zone.

The process according to the invention may be improved by making the trough of a shape such that the volume of the downstream zone is greater than the volume of the upstream zon. That makes it possible to have a more substantial reserve supply of hot liquid and to facilitate the re-melting operation, thus ensuring that a part of the crystals does not emerge from the bath.

When a very high level of metal purity is to be obtained, the process may be carried out in apparatuses which are disposed in a series of "n" stages. For example, in a two-stage system, the purified liquid issuing from the first stage supplies the second stage while the impure mother liquid from the second stage is recycled to the feed for the first stage. The amounts of liquid which circulate in each of the apparatuses corresponds at all times to the following equation: the amount of liquid introduced into the upstream zone is equal to the amounts of liquid which are drawn off in the upstream and downstream zones. The process according to the invention uses a drum, the speed of rotation of which is controlled to give a produce of the desired level of purity. In accordance with the prior art, that speed is so determined that the residence time of the surface of the drum which is immersed in the bath is equal to a certain value corresponding to the diameter of the drum multiplied by a certain coefficient. That coefficient essentially depends on the nature of the metal to be deposited, and the temperatures of the bath and the drum, being parameters which may vary in the course of the operation and generally result in random levels of purity.

The invention will be better appreciated by reference to the accompanying drawings in which.

Figure 1:
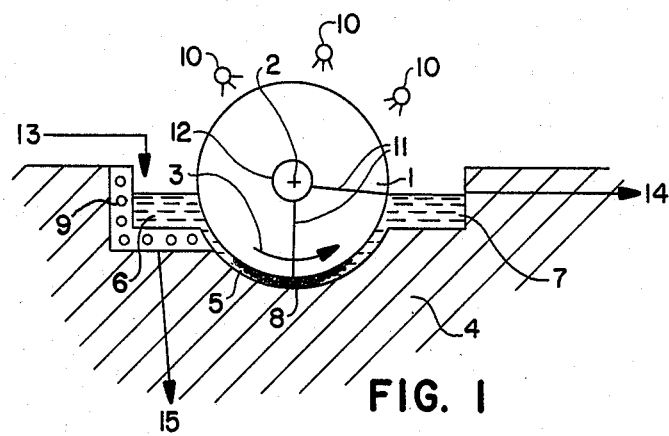
FIG. 1 shows a view in vertical section along a circle of the drum of the apparatus for carrying out the process.
Figure 2:
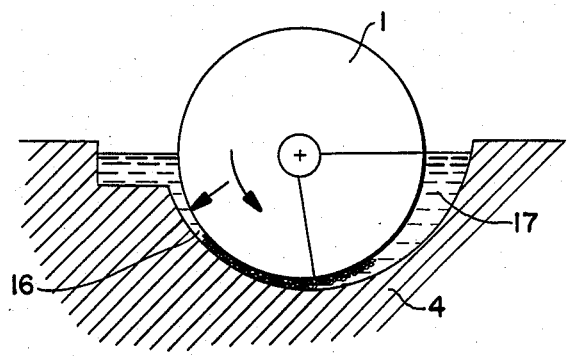
FIG. 2 shows the same sectional view in which the trough is of a special shape.

Referring to FIG. 1, shown therein is the drum 1 which is driven with a rotary movement about its aixs 2 as indicated by the arrow 3, being partially immersed in a trough or channel 4 and cooled naturally and, with said trough, forming a restricted space 5 in the shape of a portion of a ring, which divides it into two upstream and downstream zones 6 and 7 respectively, which form reserves of metal whose impurities content is increasing and purified metal respectively. The crystals 8 form on the immersed portion of the cylinder a layer which has an excrescence which creates a constriction between the two zones. Heating means 9 permit the bath in the upstream zone to be maintained in the liquid state while the non-immersed portion of the drum is cooled by cold fluid distributing assemblies 10. Re-melting of the crystals is effected by reheating the surface portion of the drum which is between the two sectors 11 by means of a hot fluid supplied by way of the hollow shaft 2 and intake and outlet openings provided in the tube. The arrows 13, 14 and 15 respectively indicate the point at which metal to be purified is introduced, the point at which pure liquid is drawn off and the point at which mother liquid charged with impurities is drawn off. FIG. 2 shows a trough 4 of a particular shape in which the space between the drum 1 and the bottom of the trough progressively decreases in the upstream zone 16 and progressively increases in the downstream zone 17 and wherein the crystal excrescence corresponds to the minimum space between the drum and the trough.

Figure 3:
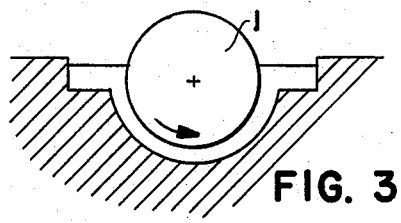
FIGS. 3, 4, 5 and 6 show the same sectional view illustrating the phases in the cyclic movement.
Figure 5:
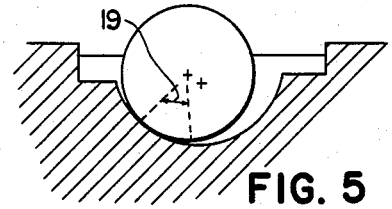
Figure 4:
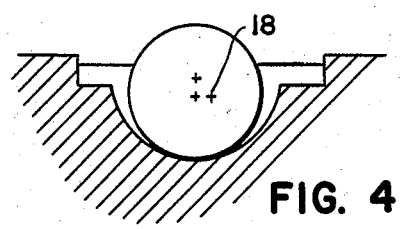
Figure 6:
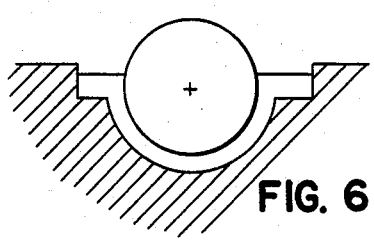

FIGS. 3 to 6 show the different sequences in the cyclic movement of the drum. In FIG. 3, the drum is in a condition of normal rotation. In FIG. 4, it is undergoing a vertical translatory movement as indicated at 18. In FIG. 5, the drum is rolling on the bottom of the downstream zone of the trough so as to compress the crystals over a length of the trough corresponding to the arc 19. In FIG. 6, the drum has returned to its initial position.

Figure 7:
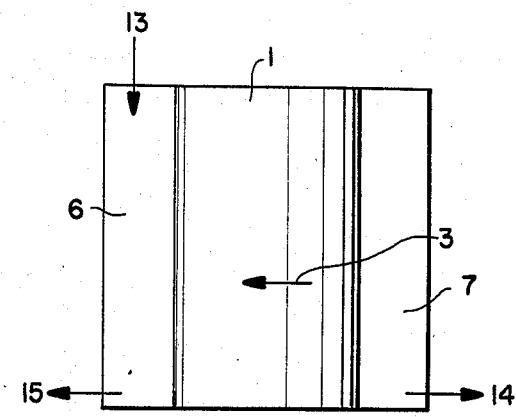
FIG. 7 shows a diagrammatic plan view of the drum and the trough.

FIG. 7 is a plan view of the drum 1 which rotates in the direction indicated by the arrow 3, and the upstream and downstream zones 6 and 7 of the trough. The metal to be purified is supplied at 13 while the purified liquid is drawn off at 14 and the liquid which has been enriched with impurities is taken off at 15.

Figure 8:
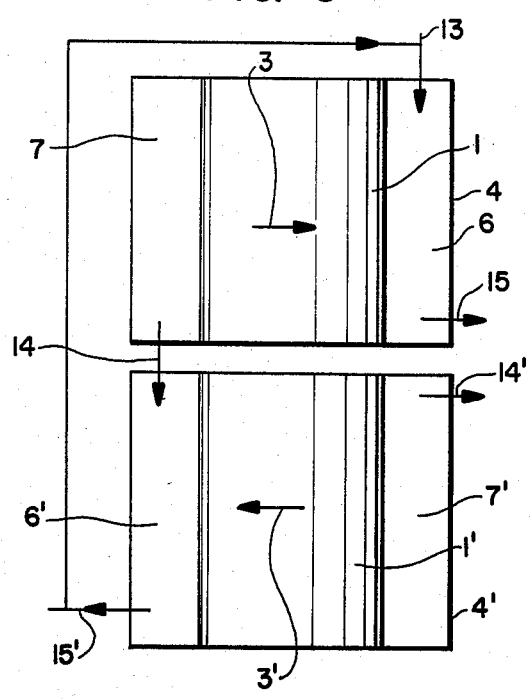
FIG. 8 shows the same view of a two-stage purification system.

FIG. 8 shows a two-stage purification system, that is to say, a system comprising two drums 1 and 1' which respectively rotate in the directions indicated by the arrows 3 and 3', being partially immersed in the troughs 4 and 4' and forming the upstream zones 6, 6' and the downstream zones 7, 7'. The metal to be purified is introduced at 13 into the upstream zone 6, crystallized on the drum 1, and re-melted in the downstream zone 7, and the liquid is introduced at 14 into the upstream zone 6' where it is crystallized on the drum 1' and then remelted in the downstream zone 7' where it is recovered in a highly pure state at 14'. The impurity-charged liquid which is taken off at 15' in the upstream zone 6' is recycled to the feed at 13 while the very impure liquid formed in the downsteam zone 6 is taken from the circuit at 15.

The invention may be illustrated by reference to the following example of use wherein an aluminium alloy containing 0.2% by weight of iron was treated in accordance with the process in the apparatus shown in FIG. 7 wherein the drum was 0.5 meter in diameter and rotated at a speed of one revolution per minute. For a temperature of the wall of the drum of 600° C., at the time at which it passed into the bath, a temperature of the metal of 670° C. in the upstream zone and temperature differences of 50° C. between the downstream and the upstream zones and 10° C. between the point at which the impurities-charged liquid was taken off and the point of supply with metal to be purified, the system produces a purified aluminium which contained not more than 0.05% of iron and a mother liquid having an iron content of 1%.

The invention can be used in all treatments for the continuous purification of metals and in particular aluminium.

I claim:

2. A process according to claim 1 characterised in that, in order to compress the crystals, said distance is regulated to a value which is less than the maximum thickness of the layer of crystals.

3. A process according to claim 1 characterised in that said distance is regulated by making the bottom of the trough of a configuraion such that the space between the drum and the bottom of the trough progressively decreases in the upstream zone (16) and increases in the downstream zone (17) in the direction of rotation of the drum.

4. A process according to claim 1 characterised in that said distance is regulated by displacing the drum with a cyclic movement comprising a downward translatory movement (18), a rotary movement over the bottom of the upstream zone of the trough and a return to the initial position.

5. A process according to claim 4 characterised in that the cyclic movement is initiated after a period of normal rotation of the drum which is at most equal to the time required for a point of the drum to pass through the whole of the upstream zone.

6. A process according to claim 1 characterised in that said distance is regulated by making the trough of a shape such that the volume of the downstream zone is greater than that of the upstream zone.

7. A process according to claim 1 characterised in that the purified liquid metal which is removed from the downstream zone is re-treated in accordance with said process.

1. A process for the continuous purification of metals by fractional crystallization on a cooled portion of the surface of a rotating drum which is partially immersed in a bath of molten metal contained in a trough, said drum dividing said trough in the direction of rotation into an upstream zone and a downstream zone, comprising the steps of:

(a) introducing the metal to be purified into the upstream zone;

(b) cooling the surface of the drum to a temperature which is lower than the solidification temperature of the bath as said surface passes into the bath, and rotating the drum so that a layer of crystals is formed on said surface as it passes into the bath, the thickness of said layer increasing as the rotation progresses within the upstream zone;

(c) regulating the distance between the drum surface and the bottom of the trough in such a manner that the upstream zone and downstream zone are virtually independent of each other;

(d) heating the downstream zone to completely remelt the layer of crystals as the layer is rotated through the downstream zone, to form a purified liquid metal; and (e) removing at least a portion of said purified liquid metal from said downstream zone.

* * * * *